United States Patent
Kwon et al.

(10) Patent No.: US 8,582,642 B2
(45) Date of Patent: Nov. 12, 2013

(54) TRANSMITTING SYSTEM AND RECEIVING SYSTEM FOR PROCESSING STREAM, AND STREAM PROCESSING METHODS THEREOF

(75) Inventors: Yong-sik Kwon, Suwon-si (KR); Hae-joo Jeong, Seoul (KR); June-hee Lee, Seongnam-si (KR); Jung-pil Yu, Suwon-si (KR); Chan-sub Park, Incheon (KR); Jung-jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1119 days.

(21) Appl. No.: 12/334,703

(22) Filed: Dec. 15, 2008

(65) Prior Publication Data

US 2009/0154552 A1 Jun. 18, 2009

Related U.S. Application Data

(60) Provisional application No. 61/013,701, filed on Dec. 14, 2007.

(30) Foreign Application Priority Data

Oct. 21, 2008 (KR) .............................. 2008-103189

(51) Int. Cl.
*H04N 7/12* (2006.01)
*H04L 29/06* (2006.01)

(52) U.S. Cl.
USPC ............ 375/240.01; 375/240.18; 375/240.26; 375/240.27; 380/204; 380/212; 380/216; 380/240; 713/160

(58) Field of Classification Search
USPC .......... 375/240.01, 240.27; 713/160; 380/240
See application file for complete search history.

(56) References Cited

U.S. PATENT DOCUMENTS 6,208,665 B1 * 3/2001 Loukianov et al. ........... 370/486
6,212,659 B1   4/2001 Zehavi
6,917,655 B2 * 7/2005 Fimoff et al. .................. 375/265

(Continued)

FOREIGN PATENT DOCUMENTS

| CN | 1953358 A | 4/2007 |
|----|-----------|--------|
| KR | 2004-35290 | 4/2004 |
| WO | 2007078123 A1 | 7/2007 |

OTHER PUBLICATIONS

International Search Report and Written Opinion issued in corresponding International Application No. PCT/KR2008/007406 dated Dec. 15, 2008.

(Continued)

*Primary Examiner* — Kambiz Zand
*Assistant Examiner* — Jenise Jackson
(74) *Attorney, Agent, or Firm* — Sughrue Mion, PLLC

(57) ABSTRACT

A system for transmitting a transport stream including a robust stream is provided. The transmitting system includes an adaptor for, when receiving a first stream, making a space in the first stream to insert a second stream; a Reed-Solomon (RS) encoder for RS-encoding the input second stream; a Cyclic Redundancy Check (CRC) processor for converting the RS-encoded second stream to a stream comprising an added CRC bit sequence; and a stuffer for inserting the stream to the space in the first stream and outputting a transport stream. Hence, the robust stream can be efficiently transmitted.

13 Claims, 12 Drawing Sheets

(56) References Cited

U.S. PATENT DOCUMENTS

| | | | |
|---|---|---|---|
| 7,924,851 B2* | 4/2011 | Kim et al. | 370/395.64 |
| 2002/0181581 A1* | 12/2002 | Birru et al. | 375/240.01 |
| 2007/0002900 A1 | 1/2007 | Karkas et al. | |
| 2008/0002765 A1* | 1/2008 | Song et al. | 375/240.01 |
| 2008/0267414 A1* | 10/2008 | Mukaide | 381/23 |

OTHER PUBLICATIONS

Communication dated Jul. 2, 2012 issubed by the State Intellectual Property Office of P.R. China in counterpart Chinese Application No. 200880118814.8.

* cited by examiner

FIG. 3

| SYNC | PID[1] | Space for M/H Data |
|------|--------|--------------------|
| SYNC | PID    | Normal Stream      |
| SYNC | PID    | Normal Stream      |
| SYNC | PID    | Normal Stream      |
| SYNC | PID[1] | Space for M/H Data |
| SYNC | PID    | Normal Stream      |
| SYNC | PID    | Normal Stream      |
| SYNC | PID    | Normal Stream      |

| SYNC | PID[1] | Space for M/H Data |
|------|--------|--------------------|
| SYNC | PID[1] | Space for M/H Data |
| SYNC | PID    | Normal Stream      |
| SYNC | PID    | Normal Stream      |
| SYNC | PID[1] | Space for M/H Data |
| SYNC | PID[1] | Space for M/H Data |
| SYNC | PID    | Normal Stream      |
| SYNC | PID    | Normal Stream      |

| SYNC | PID[1] | Space for M/H Data |
|------|--------|--------------------|
| SYNC | PID    | Normal Stream      |
| SYNC | PID    | Normal Stream      |
| SYNC | PID[1] | Space for M/H Data |
| SYNC | PID[1] | Space for M/H Data |
| SYNC | PID    | Normal Stream      |
| SYNC | PID    | Normal Stream      |
| SYNC | PID[1] | Space for M/H Data |

| SYNC | PID[1] | Space for M/H Data |
|------|--------|--------------------|
| SYNC | PID[1] | Space for M/H Data |
| SYNC | PID[1] | Space for M/H Data |
| SYNC | PID    | Normal Stream      |
| SYNC | PID[1] | Space for M/H Data |
| SYNC | PID[1] | Space for M/H Data |
| SYNC | PID[1] | Space for M/H Data |
| SYNC | PID    | Normal Stream      |

| SYNC | PID[1] | Space for M/H Data |
|---|---|---|
| SYNC | PID | Normal Stream |
| SYNC | PID[1] | Space for M/H Data |
| SYNC | PID | Normal Stream |
| SYNC | PID[1] | Space for M/H Data |
| SYNC | PID | Normal Stream |
| SYNC | PID[1] | Space for M/H Data |
| SYNC | PID | Normal Stream |

| | SYNC | PID | Normal Stream |
|---|---|---|---|
| | SYNC | PID | Normal Stream |
| | SYNC | PID | Normal Stream |
| | SYNC | PID[1] | Space for M/H Data |
| | SYNC | PID[1] | Space for M/H Data |
| | SYNC | PID[1] | Space for M/H Data |
| N | SYNC | PID[1] | Space for M/H Data |

⋮

| SYNC | PID[1] | Space for M/H Data |
|---|---|---|
| SYNC | PID[1] | Space for M/H Data |
| SYNC | PID | Normal Stream |
| SYNC | PID | Normal Stream |
| SYNC | PID | Normal Stream |

TRANSMITTING SYSTEM AND RECEIVING SYSTEM FOR PROCESSING STREAM, AND STREAM PROCESSING METHODS THEREOF

CROSS-REFERENCE TO RELATED APPLICATIONS

This application claims the benefit under 35 U.S.C. §119 (a) from U.S. Provisional Patent Application No. 61/013,701, filed on Dec. 14, 2007 in the United States Patent and Trademark Office, and Korean Application No. 2008-103189, filed Oct. 21, 2008, in the Korean Intellectual Property Office, the entire disclosures of which are incorporated herein by reference.

BACKGROUND OF THE INVENTION

1. Field of the Invention

The present invention relates generally to a transmitting system and a receiving system for transmitting, receiving and processing a stream, and processing methods thereof. More particularly, the present invention relates to a transmitting system and a receiving system for transmitting, receiving and processing a robust stream to listen to the stream even in a mobile environment, and processing methods of the systems.

2. Description of the Related Art

Based on advances of digital technologies, existing analog broadcasting systems are digitized by degrees. Naturally, countries are suggesting various digital broadcasting standards.

Of the various digital broadcasting standards, Advanced Television System Committee (ATSC) standard and Digital Video Broadcasting-Terrestrial (DVB-T) standard are attracting much attention.

The ATSC standard adopts 8-Vestigial Side Band (VSB) modulation, whereas the DVB-T standard adopts Coded Orthogonal Frequency Division Multiplex (COFDM) scheme. Since the DVB-T standard is robust to a multi-path channel, particularly, to channel interference, it facilitates the implementation of Single Frequency Network (SFN).

While the DVB-T standard has a difficulty in implementing High Definition (HD) broadcasting because of a low data rate, the ATSC standard is suitable for the HD broadcasting.

As such, the respective standards have advantages and disadvantages. The countries are attempting to suggest an optimized standard by addressing the shortcomings of the standards.

Meanwhile, in accordance with wide use of portable devices, the digital broadcasting can be viewed through the portable devices. Because of high mobility of the portable devices, a stream to be viewed at the portable device requires robust processing, compared to a normal stream.

To separately constitute and transmit the robust stream, separate digital broadcasting and relay equipment are required mostly. What is needed is a method for efficiently transmitting the robust stream using the existing digital facilities.

SUMMARY OF THE INVENTION

An aspect of the present invention has been provided to solve the above-mentioned and/or other problems and disadvantages and an aspect of the present invention provides a transmitting system and a receiving system for efficiently inserting a robust stream into a transport stream in various patterns, transmitting, receiving, and processing the stream, and stream processing methods thereof.

Additional aspects and/or advantages of the invention will be set forth in part in the description which follows and, in part, will be obvious from the description, or may be learned by practice of the invention.

According to an aspect of the present invention, a transmitting system includes an adaptor for, when receiving a first stream, making a space in the first stream to insert a second stream; a Reed-Solomon (RS) encoder for RS-encoding the input second stream; a Cyclic Redundancy Check (CRC) processor for converting the RS-encoded second stream to a stream comprising an added CRC bit sequence; and a stuffer for inserting the stream to the space in the first stream and outputting a transport stream.

The transmitting system may further include a randomizer for randomizing the input second stream and providing the randomized second stream to the RS encoder; a byte interleaver for interleaving the second stream RS-encoded at the RS encoder byte by byte and providing the interleaved stream to the CRC processor; an outer encoder for encoding the stream converted at the CRC processor; an outer interleaver for interleaving the outer-encoded stream; and a packet formatter for formatting the interleaved stream and providing the formatted stream to the stuffer.

The transmitting system may further include a sequence processor for outputting a sequence known to a receiving system; and a packet formatter for formatting the stream and the sequence respectively and providing the stream and the sequence to the stuffer.

The packet formatter may format the stream in one of a first format comprising a sync signal, a packet IDentifier (ID), and second stream data, a second format comprising a packet ID and second stream data, and a third format comprising only second stream data. The packet ID may be a null value or a new ID unrecognizable by a normal decoder of the receiving system.

The transmitting system may further include an exciter for processing the transport stream output from the stuffer and transmitting the transport stream over a radio channel.

The exciter may include a sequence processor for inserting a sequence known to a receiving system in the transport stream.

The exciter may further include an Advanced Television System Committee (ATSC) randomizer for randomizing the transport stream; an ATSC RS encoder for RS-encoding the randomized transport stream and providing the RS-encoded stream to the sequence processor; an ATSC CV interleaver for convolutionally interleaving the transport stream output from the sequence processor; a trellis encoder for trellis-encoding the convolutionally interleaved transport stream, resetting memories at a preset time, and correcting a parity of the transport stream in accordance with the memory reset; and a multiplexer (MUX) for inserting a sync signal to the transport stream output from the trellis encoder.

The adaptor may make the space in one of a first pattern which makes the space for one packet per four packets, a second pattern which makes the spaces for two packets per four packets, a third pattern which makes the spaces for three packets per four packets, a fourth pattern which makes the space for one packet per two packets, and a fifth pattern which makes the spaces for a plurality of successive packets.

According to the aspect of the present invention, a receiving system includes a robust stream processor for, upon receiving a transport stream, detecting a robust stream from the transport stream and trellis-decoding the robust stream; a Cyclic Redundancy Check (CRC) detector for checking for error based on CRC bits of the stream output from the robust stream processor; a Reed-Solomon (RS) decoder for RS-decoding the stream using the error check result of the CRC detector; and a derandomizer for derandomizing the RS-decoded stream.

The receiving system may further include a synchronizer for synchronizing the received transport stream; an equalizer for equalizing the synchronized transport stream using a known sequence in the received transport stream and providing the equalized stream to the robust stream processor; and a byte deinterleaver for deinterleaving the stream output from the CRC detector byte by byte and providing the deinterleaved stream to the RS decoder.

The transport stream may be constituted in one of a first pattern which makes the space for one packet per four packets, a second pattern which makes the spaces for two packets per four packets, a third pattern which makes the spaces for three packets per four packets, a fourth pattern which makes the space for one packet per two packets, and a fifth pattern which makes the spaces for a plurality of successive packets to insert the robust stream.

According to the aspect of the present invention, a stream processing method of a transmitting system includes when receiving a first stream, making a space in the first stream to insert a second stream; when receiving the second stream, Reed-Solomon (RS)-encoding the second stream; Cyclic Redundancy Check (CRC) processing to convert the RS-encoded second stream to a stream comprising an added CRC bit sequence; and constituting a transport stream by inserting the stream to the space in the first stream.

The stream processing method may further include formatting a sequence known to a receiving system and inserting the known sequence in the space of the first stream.

The stream processing method may further include before RS encoding, randomizing the input second stream; before CRC processing, interleaving the RS-encoded second stream byte by byte; encoding the stream converted in the CRC processing; interleaving the encoded stream; and formatting the interleaved stream to insert the formatted stream into the space of the first stream.

The formatting of the interleaved stream may format the stream in one of a first format comprising a sync signal, a packet IDentifier (ID), and second stream data, a second format comprising a packet ID and second stream data, and a third format comprising only second stream data.

The packet ID may be a null value or a new ID unrecognizable by a normal decoder of a receiving system.

The stream processing method may further include randomizing the constituted transport stream; RS-encoding the randomized transport stream; inserting a sequence known between a receiving system into the RS-encoded transport stream; convolutionally interleaving the transport stream comprising the known sequence; trellis-encoding the convolutionally interleaved transport stream, resetting memories at a preset time, and correcting a parity of the transport stream in accordance with the memory reset; and inserting a sync signal to the trellis-encoded transport stream and transmitting the stream over a radio channel.

The making of the space to inserting the second stream in the first stream may make the space in one of a first pattern which makes the space for one packet per four packets, a second pattern which makes the spaces for two packets per four packets, a third pattern which makes the spaces for three packets per four packets, a fourth pattern which makes the space for one packet per two packets, and a fifth pattern which makes the spaces for a plurality of successive packets.

According to the aspect of the present invention, a stream processing method of a receiving system includes when receiving a transport stream, robustly processing the stream by detecting a robust stream from the transport stream and trellis-decoding the robust stream; Cyclic Redundancy Check (CRC)-detecting by checking for error based on CRC bits of the robust stream; Reed-Solomon (RS)-decoding the stream using the error check result; and derandomizing the RS-decoded stream.

The stream processing method may further include synchronizing the received transport stream; before the robustly processing the stream, equalizing the synchronized transport stream using a known sequence in the received transport stream; and before RS-decoding, deinterleaving the stream processed in the CRC detecting byte by byte.

The transport stream may be constituted in one of a first pattern which makes the space for one packet per four packets, a second pattern which makes the spaces for two packets per four packets, a third pattern which makes the spaces for three packets per four packets, a fourth pattern which makes the space for one packet per two packets, and a fifth pattern which makes the spaces for a plurality of successive packets to insert the robust stream.

In various embodiments of the present invention, the stream can be processed more robustly and transceived. The robust stream can be efficiently inserted to the transport stream in diverse patterns. Therefore, the general digital broadcasting receiver can receive and process the normal stream, and the portable device can receive and process the robust stream at the same time. In addition, the equalization performance can be enhanced by means of the known sequence.

Additional and/or other aspects and advantages of the invention will be set forth in part in the description which follows and, in part, will be obvious from the description, or may be learned by practice of the invention.

BRIEF DESCRIPTION OF THE DRAWING FIGURES

These and/or other aspects and advantages of the invention will become apparent and more readily appreciated from the following description of the embodiments, taken in conjunction with the accompanying drawings of which:

FIGS. 3 through 8 are diagrams of various streams output from an adaptor of the transmitting system of FIG. 1 or FIG. 2;

DETAILED DESCRIPTION OF THE EXEMPLARY EMBODIMENTS

Figure 1:
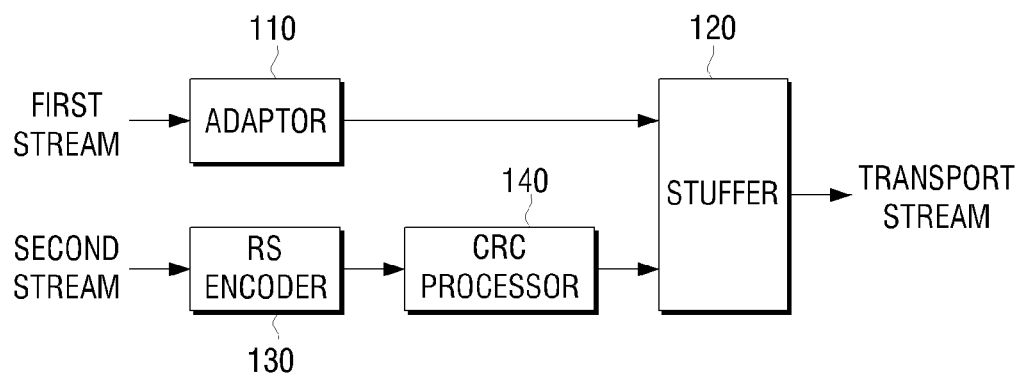
FIG. 1 is a block diagram of a transmitting system according to an exemplary embodiment of the present invention.

Reference will now be made in detail to the embodiment of the present general inventive concept, examples of which are illustrated in the accompanying drawings, wherein like reference numerals refer to the like elements throughout. The embodiment is described below in order to explain the present general inventive concept by referring to the drawings.

FIG. 1 is a block diagram of a transmitting system according to an exemplary embodiment of the present invention. The transmitting system of FIG. 1 includes an adaptor 110, a stuffer 120, a Reed-Solomon (RS) encoder 130, and a Cyclic Redundancy Check (CRC) processor 140.

The adaptor 110 receives a first stream and generates a space for inserting a second stream in the first stream. To make the space, the adaptor 110 may generate an adaptation field in each packet of the first stream or use a payload of the packet as the space. Herein, the first stream can be a general broadcasting signal transceived and processed at the existing broadcasting system; that is, a normal stream. The adaptor 110 makes the space in the first stream with a preset pattern, which will be further explained in reference to FIGS. 3 through 8.

The RS encoder 130 receives and RS-encodes the second stream. Herein, the second stream indicates a stream processed differently from the first stream. In more detail, the second stream can be a robust stream (or turbo stream or Advanced Vestigial Side Band (AVSB) stream) robustly processed to be received at a portable device. The second stream can be input from a source different from the first stream as the robust stream, or received from the same source as the same stream and robustly processed at the RS encoder 130 and the CRC processor 140.

The CRC processor 140 converts the RS-encoded second stream to a stream including a CRC bit sequence. The CRC processor 140 shifts data of the second stream by the number of Frame Check Sequence (FCS) bits, divides the data by a predefined generator polynomial, and acquires the remainder. The CRC processor 140 adds the acquired remainder; that is, the CRC bit sequence (or the FCS) to the second stream, and provides the stream to the stuffer 120.

The stuffer 120 inserts the stream output from the CRC processor 140 into the first stream output from the adaptor 110. That is, the second stream including the CRC bit sequence is inserted in the space of the first stream. Thus, a transport stream including both the first stream and the second stream is generated.

As both of the RS encoder 130 and the CRC processor 140 lie in the second stream processing path in FIG. 1, the second stream is processed more robustly and then transmitted. Thus, various wireless mobile devices can effectively receive and process the stream.

Figure 2:
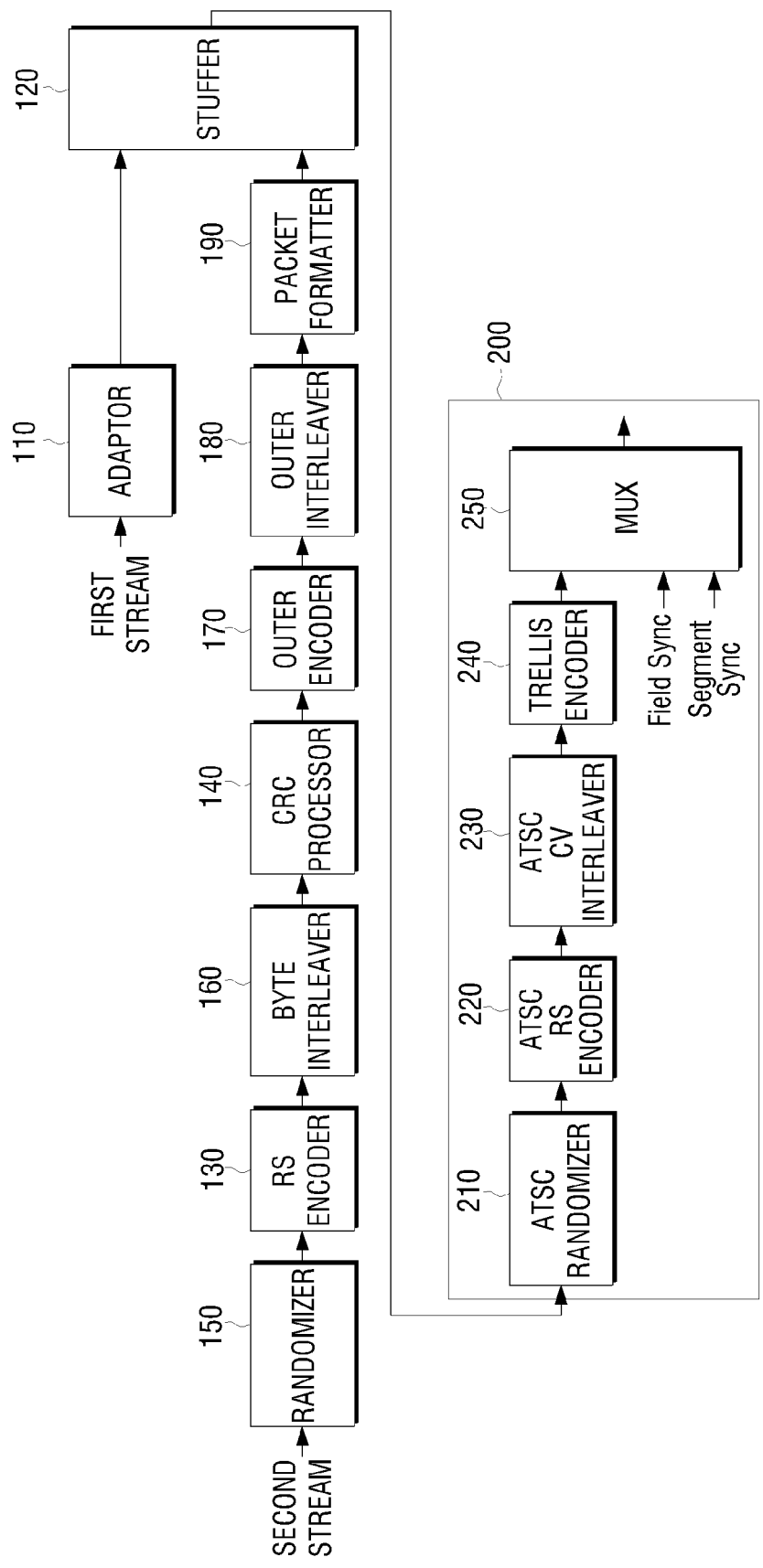
FIG. 2 is a detailed block diagram of the transmitting system according to an exemplary embodiment of the present invention.

FIG. 2 is a detailed block diagram of the transmitting system according to an exemplary embodiment of the present invention. In addition to the adaptor 110, the stuffer 120, the RS encoder 130, and the CRC processor 140, the transmitting system of FIG. 2 can further include a randomizer 150, a byte interleaver 160, an outer encoder 170, an outer interleaver 180, a packet formatter 190, and an exciter 200. Note that the arrangement order of the components can vary, some of the components can be omitted, and components not illustrated in FIG. 2 can be further provided in various embodiments.

As in FIG. 1, the adaptor 110 makes the space in the first stream. The stuffer 120 constitutes the transport stream by inserting the second stream; that is, the robust stream in the space of the first stream. The robust stream can be processed through the randomizer 150, the RS encoder 130, the byte interleaver 160, the CRC processor 140, the outer encoder 170, the outer interleaver 180, and the packet formatter 190, and then provided to the stuffer 120.

The randomizer 150 randomizes the second stream fed from an external source. The RS encoder 130 RS-encodes the randomized second stream. In the RS encoding, various coding rates can be applied.

The byte interleaver 160 interleaves the RS-encoded second stream byte by byte. The CRC processor 140 calculates and adds the CRC bit sequence to the bytewise interleaved second stream.

The outer encoder 170 and the outer interleaver 180 outer-encodes and outer-interleaves the stream output from the CRC processor 140.

The packet formatter 190 converts a packet format so that the outer-interleaved stream can be easily inserted to the first stream. The packet generally includes a sync, a packet IDentifier (ID), and a payload.

When the adaptor 110 ensures one entire packet, the packet formatter 190 formats the stream in a format including all of the sync, the packet ID, and the second stream data (hereafter, referred to as a first format). When the adaptor 110 empties only the packet ID and the payload, the packet formatter 190 formats the stream in a format including the packet ID and the second stream data (hereafter, referred to as a second format). When the adaptor 110 empties only the payload, the packet formatter 190 formats the stream in a format including only the second stream data (hereafter, referred to as a third format).

The second stream does not target the conventional digital receive stream. To avoid data cross, it is preferable that the packet formatter 190 should assign a null value for the packet ID of the second data stream, or use a new ID unrecognizable by a normal decoder (not shown) of the receiving system.

The stream converted in the proper format is inserted to the first stream at the stuffer 120, to thus generate the transport stream.

The exciter 200 properly processes the transport stream output from the stuffer 120 and transmits the transport stream over a radio channel. The exciter 200 can include an Advanced Television System Committee (ATSC) randomizer 210, an ATSC RS encoder 220, an ATSC CV interleaver 230, a trellis encoder 240, and a multiplexer (MUX) 250 as shown in FIG. 2.

The ATSC randomizer 210 randomizes the transport stream. The ATSC RS encoder 220 RS-encodes the randomized transport stream.

The ATSC CV interleaver 230 convolutionally interleaves the RS-encoded transport stream. In further detail, the ATSC CV interleaver 230 interleaves the bits of the transport stream by storing the transport stream to a plurality of memory elements having different lengths in sequence and sequentially outputting the transport stream.

The trellis encoder 240 trellis-encodes the convolutionally interleaved transport stream. When a known sequence is inserted to and transmitted together with the first stream, the sequence is highly likely to be changed by initial values pre-stored to memories of the trellis encoder 240. To avoid this, the trellis encoder 240 resets the memories at a preset time point. Since a parity bit is already added to the transport stream through the RS encoding at the ATSC RS encoder 220, it is preferable that the trellis encoder 240 should correct the parity according to the changed values in the memory resetting.

The MUX 250 inserts a sync signal to the transport stream output from the trellis encoder 240. The sync signal can employ a field sync signal, a segment sync signal, and so forth.

The transport stream including the sync signal is channel-modulated at a modulator (not shown), up-converted to a Radio Frequency (RF) signal, and then transmitted via an antenna over the radio channel.

FIGS. 3 through 8 depict various transport streams according to various embodiments of the present invention.

The adaptor 110 of the transmitting system makes a space for the second stream per four packets as shown in FIG. 3. In FIGS. 3 through 8, the first stream is the normal stream and the second stream is Mobile/Handheld (M/H) data provided to an M/H device by way of example.

The adaptor 110 may empty one entire packet, or other packet regions excluding SYNC or PID, for the second stream. The PID of the packet with the M/H data inserted uses PID(1) which is distinguished from the PID of the packet including the normal stream. The PID(1) indicates a packet ID unrecognizable by the normal stream. The PID(1) and the format of the M/H data can be constituted by the packet formatter 190.

The adaptor 110 may make two spaces for the second stream per four packets as shown in FIGS. 4 and 5. As one can see in FIGS. 4 and 5, the packet order can vary.

The adaptor 110 may make three spaces for the second stream per four streams as shown in FIG. 6, or make a space for the second stream per two streams; that is, make the spaces for inserting the first and second streams in alternation as shown in FIG. 7.

The adaptor 110 may entirely empty n-ary packet regions and use them as the space for the second stream as shown in FIG. 8. For example, when the normal streams are not input for a certain time duration or when there is no need to output the streams in succession, the adaptor 110 can arrange the space to insert the M/H data into the successive packets as shown in FIG. 8.

As such, the transport stream can be constituted in various patterns in the transmitting system.

Figure 9:
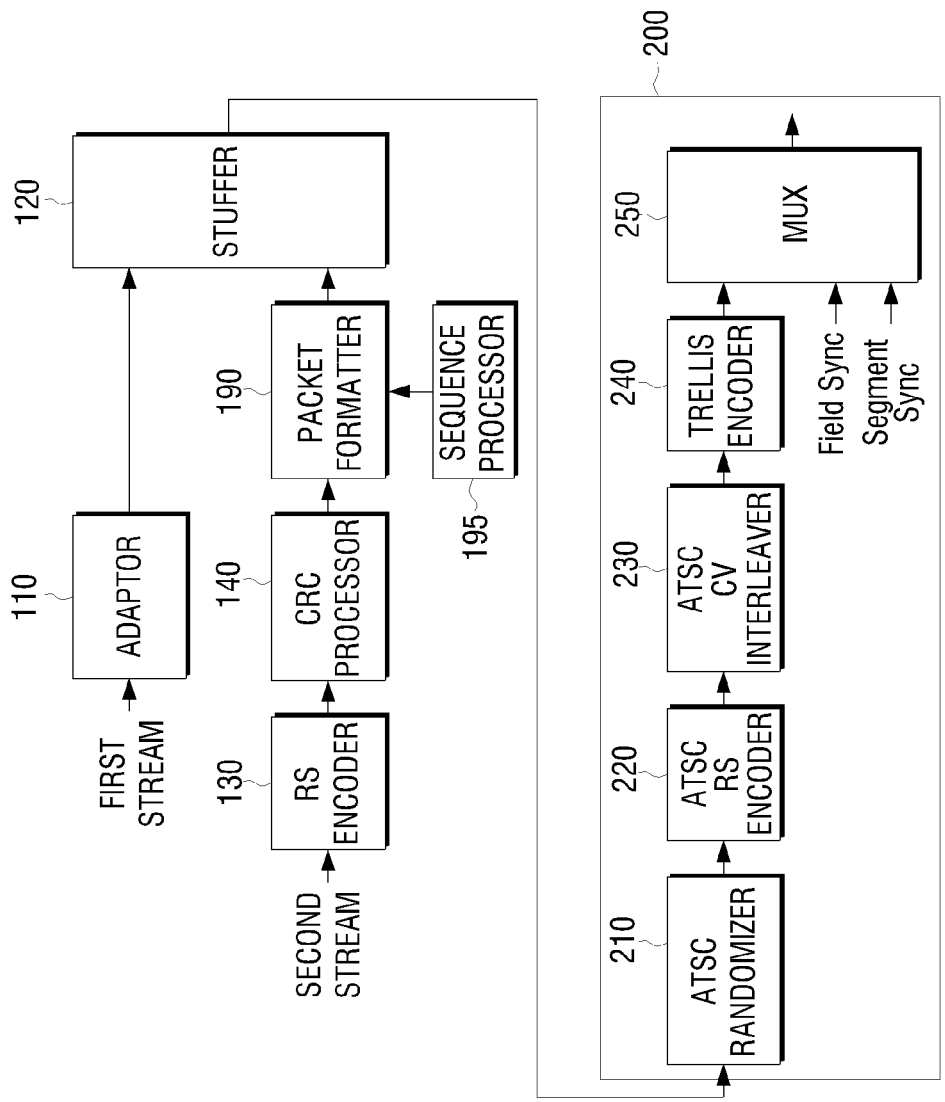
FIG. 9 is a block diagram of a transmitting system according to another exemplary embodiment of the present invention.

FIG. 9 is a block diagram of a transmitting system according to another exemplary embodiment of the present invention. The transmitting system of FIG. 9 can include an adaptor 110, a stuffer 120, an RS encoder 130, a CRC processor 140, a packet formatter 190, a sequence processor 195, and an exciter 200.

The components, excluding the sequence processor 195, are substantially the same as in FIGS. 1 and 2 and shall not be explained here.

The sequence processor 195 provides the sequence known between the receiving system to the packet formatter 190. Herein, the known sequence can be a reference signal used for channel synchronization or equalization at the receiving system. More specifically, the known sequence can be a Supplementary Reference Signal (SRS).

The packet formatter 190 formats the sequence fed from the sequence processor 195 and provides the formatted sequence to the stuffer 120.

In the end, the stuffer 120 inserts the second stream robustly processed through the RF encoder 130 and the CRC processor 140 and the sequence processed through the sequence processor 195 into the first stream, thereby configuring a transport stream.

The sequence processor 195 may be located at a front end of the stuffer 120 as shown in FIG. 9, or may be located in the exciter 200.

Figure 10:
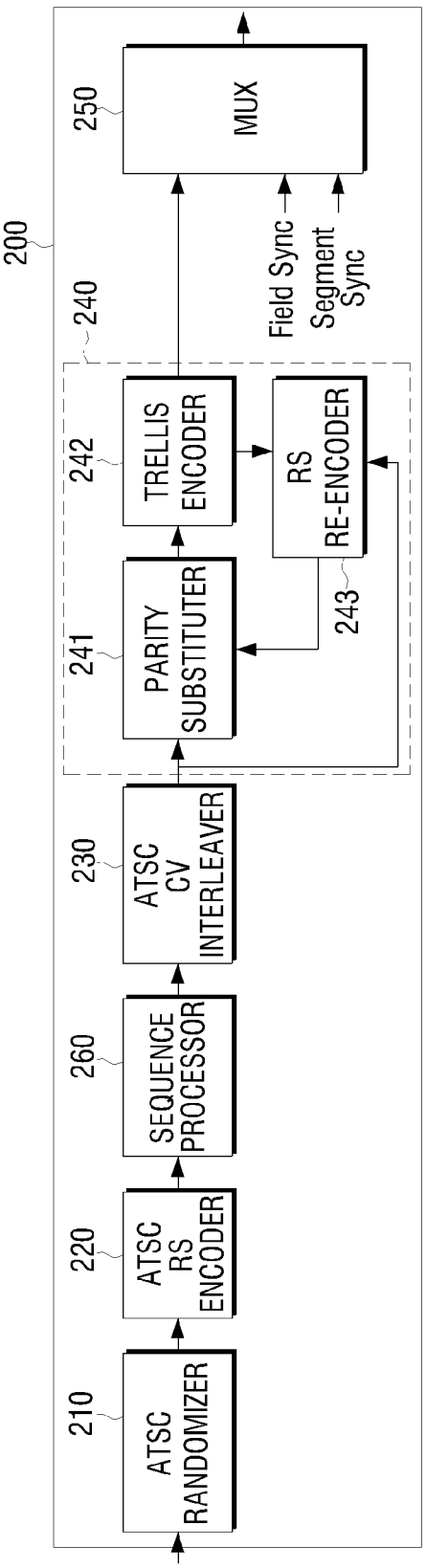
FIG. 10 is a block diagram of an exciter in a transmitting system according to yet another exemplary embodiment of the present invention.

FIG. 10 is a block diagram of an exciter including a sequence processor. Referring to FIG. 10, the exciter 200 can include an ATSC randomizer 210, an ATSC RS encoder 220, a sequence processor 260, an ATSC CV interleaver 230, a trellis encoder 240, and a multiplexer (MUX).

The ATSC randomizer 210 randomizes the transport stream configured by the stuffer 120, and the ATSC RS encoder 220 encodes the randomized transport stream.

The sequence processor 260 inserts the above-described sequence into a space provided in the encoded transport stream. The ATSC CV interleaver 230 interleaves the transport stream into which the sequence is inserted and provides the interleaved transport stream to the trellis encoder 240.

The trellis encoder 240 includes a parity substituter 241, a trellis encoder 242, and an RS re-encoder 243.

The trellis encoder 242 trellis-encodes the transport stream. The trellis encoder 242 may consist of 12 trellis encoding modules. Accordingly, the trellis encoding modules are selected from $1^{st}$ to $12^{th}$ in sequence and continuously according to received packets, and output respective trellis encoding values.

Each of the trellis encoding modules may include a plurality of multiplexers (MUXs), a plurality of memories, and a plurality of adders. The memories are co-operated in a shift manner.

The trellis encoder 242 initializes memories of each of the trellis encoding modules before a known sequence part of the interleaved transport stream is input. Since the trellis encoder 242 includes a plurality of memories, a current input value is affected by a previous input value. Accordingly, there is a possibility that the known sequence value changes, and, in order to prevent the change in the sequence, the memories are initialized before the sequence is input.

More specifically, before a sequence interval is input, the trellis encoder 242 substitutes an input value of about 2 bit interval (hereinafter, referred to as a 2 bit input interval) for the same value as a value pre-stored in each memory of each trellis encoding module, and performs a OR operation so that each memory can be re-set for the 2 bit input interval.

The trellis encoder 242 provides the values pre-stored in the memories to the RS re-encoder 243 to correct parity.

The RS re-encoder 243 generates a parity bit for the provided values and provides the parity bit to the parity substituter 241.

The parity substituter 241 substitutes the parity bit corresponding to the 2 bit input interval with the parity bit provided by the RS re-encoder 243 to correct the parity. That is, since the input value of a 2 bit input interval changes by the trellis encoder 242 after having been already encoded by the ATSC RS encoder 220, the parity should be corrected according to the changed value.

As described, the trellis encoder 240 is operated in a general mode to trellis-encode packets of an incoming transport stream and in a parity correction mode to correct parity subsequent to the initialization.

The MUX 250 is provided with the transport stream trellis encoded with parity being corrected, and multiplexes field sync and segment sync. A modulator or a power amplifier may be provided on a rear end of the MUX 250, but their detailed description will be omitted since they are well known to the related art.

Figure 11:
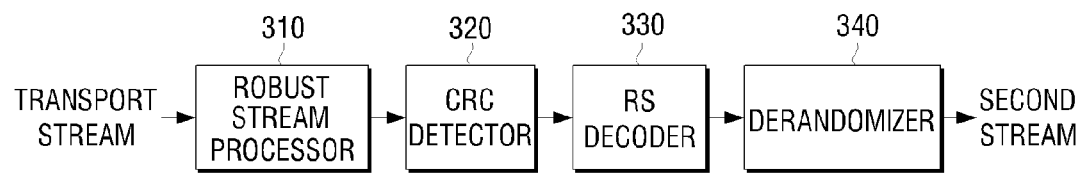
FIG. 11 is a block diagram of a receiving system according to an exemplary embodiment of the present invention.

FIG. 11 is a block diagram of a receiving system according to an exemplary embodiment of the present invention. The receiving system of FIG. 11 includes a robust stream processor 310, a CRC detector 320, an RS decoder 330, and a derandomizer 340.

The robust stream processor 310 detects the robust stream; that is, the second stream from the transport stream received over the antenna and trellis-decodes the detected stream.

The CRC detector 320 checks for error based on the CRC bits of the stream output from the robust stream processor 310.

The RS decoder 330 RS-decodes the stream using the check result of the CRC detector 320. Since the CRC detector 320 locates the error using the CRC bit sequence, the decoding efficiency of the RS decoder 330 can be enhanced.

The derandomizer 340 restores the second stream by derandomizing the RS-decoded stream.

The receiving system may further include separate components for processing the normal stream. In this case, the receiving system can receive one transport stream and recover the normal stream and the M/H stream all together by processing the transport stream in two paths.

Figure 12:
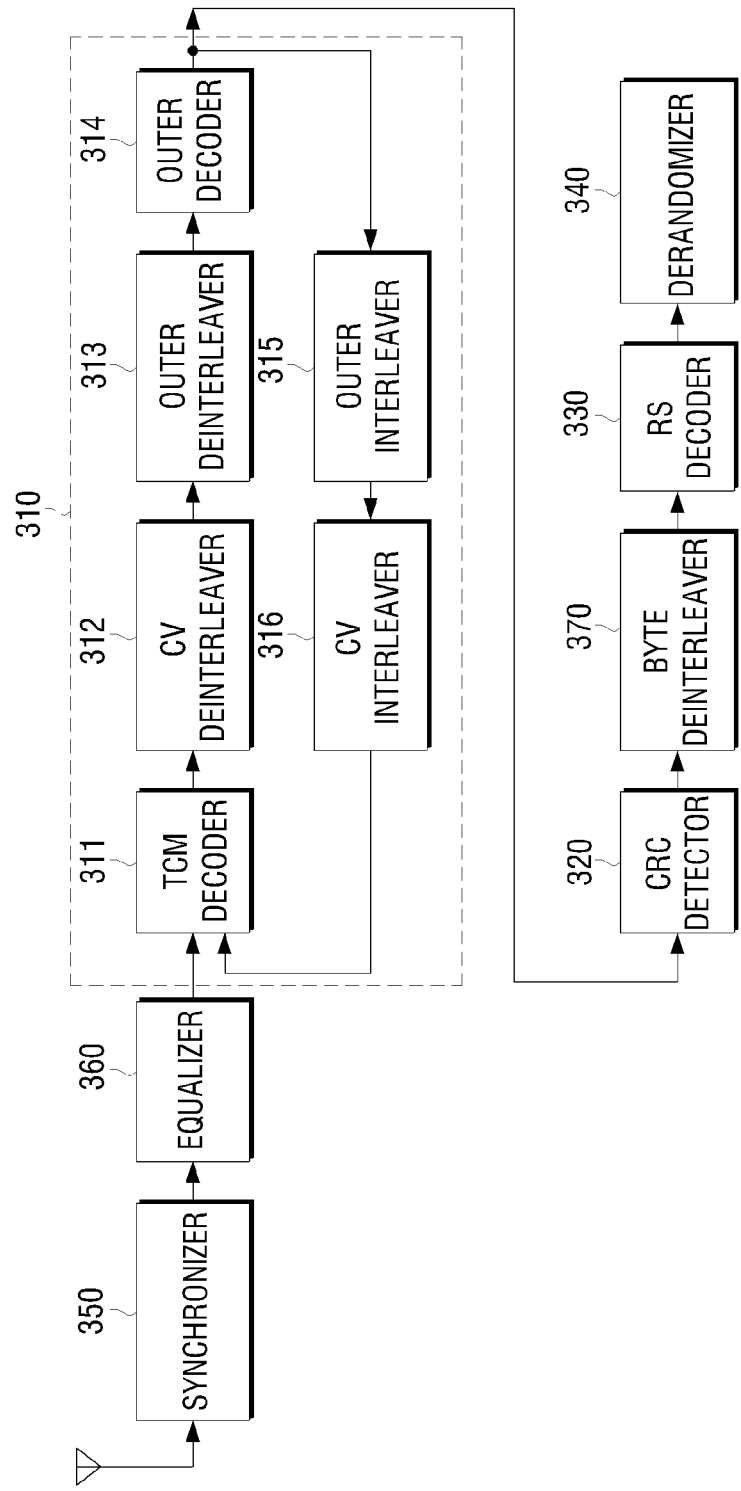
FIG. 12 is a detailed block diagram of the receiving system according to an exemplary embodiment of the present invention.

FIG. 12 is a detailed block diagram of the receiving system of FIG. 11. The receiving system of FIG. 12 can further include a synchronizer 350 and an equalizer 360 in front of the robust stream processor 310, and a byte deinterleaver 370 in between the CRC detector 320 and the RS decoder 330. Although it is not depicted in the drawing, the receiving system may further include a demodulator.

The synchronizer 350 detects and acquires synchronization from the received transport stream, and provides the transport stream to the equalizer 360.

The equalizer 360 cancels interference between the received symbols by equalizing the input transport stream and compensating for a channel distortion caused by the channel multipath. For the equalization, the equalizer 360 can detect and use the known sequence inserted in the transport stream.

The robust stream processor 310 includes a TCM decoder 311, a CV deinterleaver 312, an outer deinterleaver 313, an outer decoder 314, an outer interleaver 315, and a CV interleaver 316.

The TCM decoder 311 detects the second stream from the equalized transport stream and trellis-decodes the second stream.

The CV deinterleaver 312 convolutionally deinterleaves the trellis-decoded second stream. The outer deinterleaver 313 outer-deinterleaves the second stream. The outer decoder 314 removes the parity bit from the second stream by decoding the second stream.

The outer decoder 314 can output a soft decision value or a hard decision value according to the decoding result. Upon the hard decision, the second stream is output to the CRC detector 320. Upon the soft decision, the outer interleaver 315 interleaves the second stream and provides the interleaved second stream to the CV interleaver 316.

The CV interleaver 316 convolutionally interleaves the second stream and outputs the interleaved second stream to the TCM decoder 311. As such, the trellis decoding is repeated until the hard decision is produced, to thus attain the reliable decoding value.

Alternatively, without using the hard decision value and the soft decision value, the trellis decoding may be set to repeat for a preset number of times.

The trellis-decoded second stream is fed to the CRC detector 320.

The CRC detector 320 locates error by detecting the CRC bit sequence.

The byte deinterleaver 370 deinterleaves the output of the CRC detector 320 byte by byte.

The RS decoder 330 RS-decodes the stream output from the byte deinterleaver 370. The derandomizer 340 recovers the data of the second stream by derandomizing the second stream.

Figure 13:
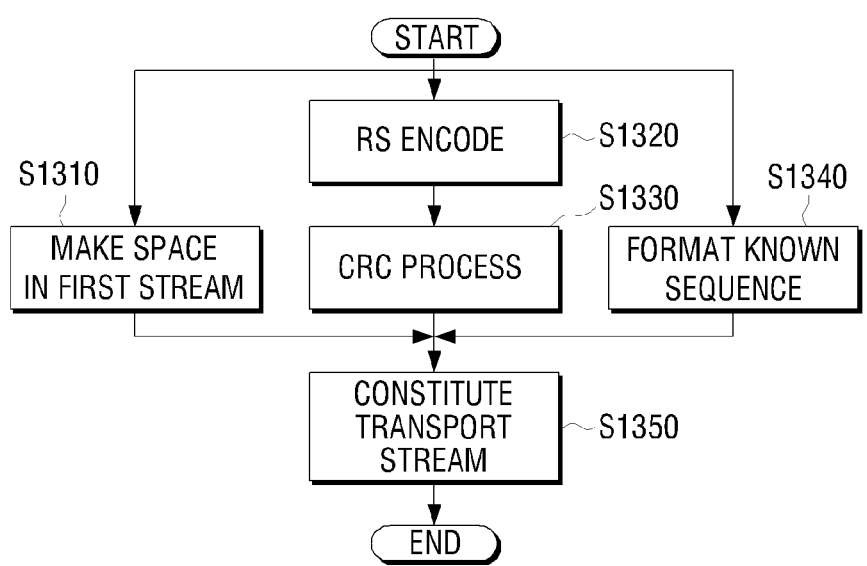
FIG. 13 is a flowchart outlining a stream processing method of the transmitting system according to an exemplary embodiment of the present invention.

FIG. 13 is a flowchart outlining a stream processing method of the transmitting system according to an exemplary embodiment of the present invention. The transmitting system individually receives the first stream and the second stream, makes the space in the first stream to insert the second stream (S1310), and RS-encodes the second stream (S1320).

Herein, the space can be the adaptation field in the first stream, or the entire packet payload.

Next, the transmitting system CRC-processes the RS-encoded second stream (S1330). That is, the CRC bit sequence for the second stream is calculated and appended.

Separately, the known sequence can be processed. The transmitting system receives and formats the sequence commonly known between the receiving system (S1340).

The transmitting system constitutes the transport stream by inserting the second stream including the CRC bit sequence into the first stream and the formatted sequence (S1350).

As stated above, the system for transmitting the first stream processed in the typical manner; that is, the normal stream can send the second stream robustly processed; that is, the robust stream together with the known sequence.

In various implementations of the present invention, the stream processing method of FIG. 13 can further include a randomizing step, a byte interleaving step, an outer encoding step, and a packet formatting step. The temporal order of some steps may be changed.

Figure 14:
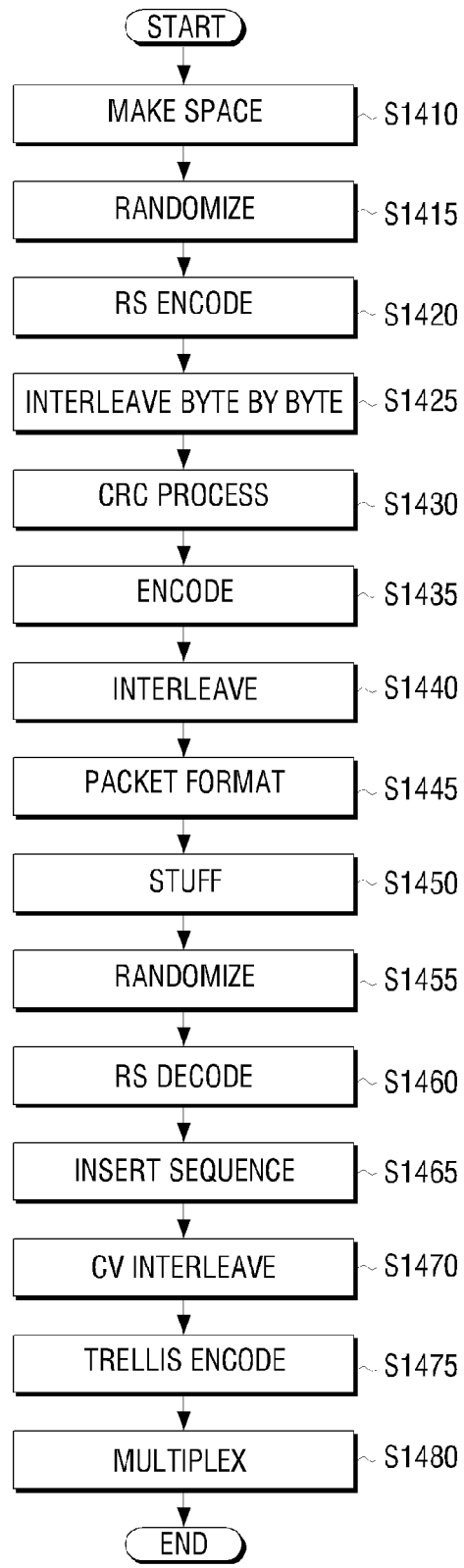
FIG. 14 is a flowchart outlining a stream processing method of the transmitting system according to another exemplary embodiment of the present invention.

FIG. 14 is a flowchart outlining a stream processing method of the transmitting system according to another exemplary embodiment of the present invention. The transmitting system makes the space in the first stream (S1410), separately receives the second stream (S1415), and performs the randomizing (S1415), the RS-encoding (S1420), the byte-wise interleaving (S1425), the CRC processing (S1430), the encoding (S1435), the interleaving (S1440), and the packet formatting (S1445) on the second stream in that order. The respective steps have been illustrated in FIG. 2 and shall not be further described. Although the making of the space in the first stream (S1410) precedes the other steps, the step S1410 is separately conducted and accordingly the order of the steps can be altered.

Next, the transmitting system stuffs the space of the first stream with the formatted second stream (S1450).

Hence, when the transport stream is constituted, the transmitting system randomizes (S1455) the transport stream and RS-encodes the transport stream (S1460).

Next, the transmitting system inserts the sequence to the RS-encoded transport stream (S1465). The inserted sequence is commonly known to the receiving system and can be the SRS.

Upon completing the sequence insertion, the transmitting system convolutionally interleaves the transport stream (S1470) and trellis-encodes the interleaved transport stream (S1475).

The transmitting system multiplexes the transport stream with the sync signals (S1480) and transmits the stream after the modulation and the amplification.

Figure 15:
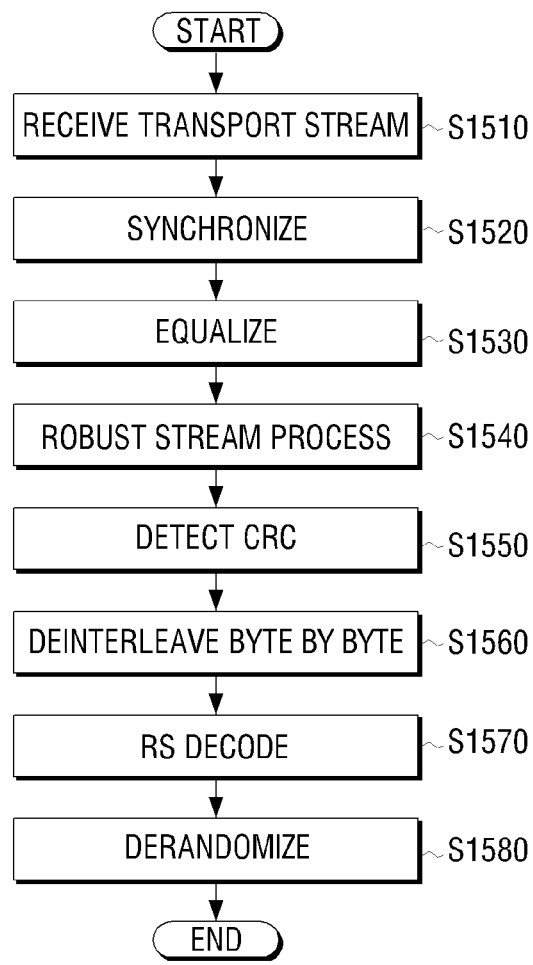
FIG. 15 is a flowchart outlining a stream processing method of the receiving system according to an exemplary embodiment of the present invention.

FIG. 15 is a flowchart outlining a stream processing method of the receiving system according to an exemplary embodiment of the present invention.

Upon receiving the transport stream (S1510), the receiving system synchronizes the received transport stream (S1520) and equalizes the synchronized transport stream (S1530).

The receiving system detects the robust stream; that is, the second stream from the equalized transport stream and conducts the robust stream processing on the second stream (S1540). The robust stream processing has been described in detail in FIG. 12 and shall not be further explained.

After the robust stream processing, the receiving system detects the CRC bit sequence from the processed stream (S1550) and deinterleaves the stream byte by byte (S1560).

The receiving system recovers the robust stream by RS-decoding (S1570) and derandomizing (S1580).

Thus, even a wireless device frequently moving around can receive the robust stream.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A transmitting system comprising:
   an adaptor for, when receiving a first stream, making a space in the first stream to insert a second stream;
   a randomizer for randomizing the input second stream:
   a Reed-Solomon (RS) encoder for RS-encoding the randomized second stream;
   a byte interleaver for interleaving the second stream RS-encoded at the RS encoder byte by byte:
   a Cyclic Redundancy Check (CRC) processor for converting the interleaved second stream to a stream comprising an added CRC bit sequence;
   an outer encoder for encoding the stream converted at the CRC processor;
   an outer interleaver for interleaving the outer-encoded stream;
   a packet formatter for formatting the interleaved stream; and
   a stuffer for inserting the formatted stream to the space in the first stream and outputting a transport stream.

2. The transmitting system of claim 1, further comprising:
   a sequence processor for outputting a sequence known to a receiving system;
   and a packet formatter for formatting the second stream and the sequence respectively and providing the stream and the sequence to the stuffer.

3. The transmitting system of claim 2, wherein the packet formatter formats the stream in one of a first format comprising a sync signal, a packet IDentifier (ID), and second stream data, a second format comprising a packet ID and second stream data, and a third format comprising only second stream data,
   wherein the packet ID is a null value or a new ID unrecognizable by a normal decoder of the receiving system.

4. The transmitting system of claim 1, further comprising:
   an exciter for processing the transport stream output from the stuffer and transmitting the transport stream over a radio channel.

5. The transmitting system of claim 4, wherein the exciter comprises:
   a sequence processor for inserting a sequence known to a receiving system in the transport stream.

6. The transmitting system of claim 5, wherein the exciter further comprises:
   an Advanced Television System Committee (ATSC) randomizer for randomizing the transport stream;
   an ATSC RS encoder for RS-encoding the randomized transport stream and providing the RS-encoded stream to the sequence processor;
   an ATSC CV interleaver for convolutionally interleaving the transport stream output from the sequence processor;
   a trellis encoder for trellis-encoding the convolutionally interleaved transport stream, resetting memories at a preset time, and correcting a parity of the transport stream in accordance with the memory reset; and
   a multiplexer (MUX) for inserting a sync signal to the transport stream output from the trellis encoder.

7. The transmitting system of claim 1, wherein the adaptor makes the space in one of a first pattern which makes the space for one packet per four packets, a second pattern which makes the spaces for two packets per four packets, a third pattern which makes the spaces for three packets per four packets, a fourth pattern which makes the space for one packet per two packets, and a fifth pattern which makes the spaces for a plurality of successive packets.

8. A receiving system comprising:
   a stream processor for, when receiving a transport stream, processing an additional stream included in the transport stream
   a Cyclic Redundancy Check (CRC) detector for checking for error based on CRC bits of the stream output from the stream processor;
   a Reed-Solomon (RS) decoder for RS-decoding the stream using the error check result of the CRC detector;
   a derandomizer for derandomizing the RS-decoded stream,
   wherein the stream processor comprises:
   a TCM decoder for trellis-decoding the additional stream;
   a deinterleaver for deinterleaving the trellis-decoded additional stream;
   an outer decoder for outer decoding the deinterleaved additional stream; and
   an interleaver for interleaving the outer decoded additional stream and outputting the interleaved additional stream to the TCM decoder.

9. The receiving system of claim 8, further comprising:
   a synchronizer for synchronizing the received transport stream;
   an equalizer for equalizing the synchronized transport stream using a known sequence in the received transport stream and providing the equalized stream to the stream processor; and
   a byte deinterleaver for deinterleaving the stream output from the CRC detector byte by byte and providing the deinterleaved stream to the RS decoder.

10. The receiving system of claim 8, wherein the transport stream is constituted in one of a first pattern which makes the space for one packet per four packets, a second pattern which makes the spaces for two packets per four packets, a third pattern which makes the spaces for three packets per four packets, a fourth pattern which makes the space for one packet per two packets, and a fifth pattern which makes the spaces for a plurality of successive packets to insert the additional stream.

11. A stream processing method of a receiving system, the method comprising:
   when receiving a transport stream, processing the stream by processing an additional stream included in the transport stream;
   checking an error based on CRC bits of the additional stream;

Reed-Solomon (RS)-decoding the stream using the error check result; and derandomizing the RS-decoded stream, wherein the processing the stream comprises:

trellis-decoding the detected additional stream by a TCM decoder;

deinterleaving the trellis-decoded additional stream;

outer decoding the deinterleaved additional stream; and interleaving the outer decoded additional stream and outputting the interleaved additional stream to the TCM decoder.

12. The stream processing method of claim 11, further comprising:

synchronizing the received transport stream;

before the processing the stream, equalizing the synchronized transport stream using a known sequence in the received transport stream; and before RS-decoding, deinterleaving the stream processed in the CRC detecting byte by byte.

13. The stream processing method of claim 11, wherein the transport stream is constituted in one of a first pattern which makes the space for one packet per four packets, a second pattern which makes the spaces for two packets per four packets, a third pattern which makes the spaces for three packets per four packets, a fourth pattern which makes the space for one packet per two packets, and a fifth pattern which makes the spaces for a plurality of successive packets to insert the additional stream.

* * * * *